US011964481B2

(12) United States Patent
Kitada

(10) Patent No.: US 11,964,481 B2
(45) Date of Patent: Apr. 23, 2024

(54) LIQUID DISCHARGE HEAD AND ACTUATOR

(71) Applicant: Seiko Epson Corporation, Tokyo (JP)

(72) Inventor: Kazuya Kitada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 56 days.

(21) Appl. No.: 17/512,907

(22) Filed: Oct. 28, 2021

(65) Prior Publication Data

US 2022/0134753 A1 May 5, 2022

(30) Foreign Application Priority Data

Oct. 30, 2020 (JP) ................................. 2020-182868

(51) Int. Cl.
*B41J 2/14* (2006.01)

(52) U.S. Cl.
CPC ................................. *B41J 2/14233* (2013.01)

(58) Field of Classification Search
None
See application file for complete search history.

(56) References Cited

U.S. PATENT DOCUMENTS

2006/0066180 A1* 3/2006 Nanataki .............. B41J 2/14233 310/358
2015/0270475 A1* 9/2015 Isshiki ................... B41J 2/1629 310/360
2016/0096368 A1* 4/2016 Yazaki ................... B41J 2/1632 347/70
2019/0074428 A1* 3/2019 Mardilovich .......... B41J 2/1642

FOREIGN PATENT DOCUMENTS

JP 2011-238774 11/2011

* cited by examiner

*Primary Examiner* — Erica S Lin
(74) *Attorney, Agent, or Firm* — WORKMAN NYDEGGER

(57) ABSTRACT

A liquid discharge head includes a pressure chamber plate having a plurality of pressure chambers arranged in a first direction, a vibrating plate disposed at a position further than the pressure chamber plate in a second direction intersecting the first direction, at least one first electrode disposed at a position further than the vibrating plate in the second direction, a piezoelectric layer disposed at a position further than the first electrode in the second direction, and a second electrode disposed at a position further than the first electrode in the second direction. The piezoelectric layer has a first area that does not overlap the first electrode in the first direction and a second area that overlaps the first electrode in the first direction, and the first area exhibits a first preferred orientation and the second area exhibits the first preferred orientation when the piezoelectric layer is analyzed by X-ray diffraction.

15 Claims, 7 Drawing Sheets

LIQUID DISCHARGE HEAD AND ACTUATOR

The present application is based on, and claims priority from JP Application Serial Number 2020-182868, filed Oct. 30, 2020, the disclosure of which is hereby incorporated by reference herein in its entirety.

BACKGROUND

1. Technical Field

The present disclosure relates to a liquid discharge head and an actuator.

2. Related Art

Liquid discharge heads that have a vibrating plate having pressure chambers and that discharge liquid filled in the pressure chambers by vibrating the vibrating plate by using piezoelectric elements have been proposed.

The piezoelectric element described in JP-A-2011-238774 includes a lower electrode, a piezoelectric thin film, and an upper electrode. A seed layer is disposed on the lower electrode such that the piezoelectric thin film has a desired orientation.

In a structure in which a seed layer is disposed on a lower electrode, for example, as in JP-A-2011-238774, the area of the piezoelectric layer overlapping the lower electrode has a desired orientation because the seed layer is present, whereas the area of the piezoelectric layer not overlapping the lower electrode has no orientation because no seed layer is present in this area. This structure results in different crystal orientations between the area overlapping and the area not overlapping the lower electrode of the piezoelectric layer. Such a structure having different crystal orientations between the area overlapping and the area not overlapping the lower electrode of the piezoelectric layer has different physical properties, such as thermal expansion coefficients, in the areas. As a result, cracks or the like may occur between the areas, resulting in degraded discharge performance and degraded durability.

SUMMARY

To solve the above-described problem, a liquid discharge head according to an aspect of the present disclosure includes a pressure chamber plate having a plurality of pressure chambers arranged in a first direction, a vibrating plate disposed at a position further than the pressure chamber plate in a second direction intersecting the first direction, at least one first electrode disposed at a position further than the vibrating plate in the second direction, a piezoelectric layer disposed at a position further than the first electrode in the second direction, and a second electrode disposed at a position further than the first electrode in the second direction. The piezoelectric layer has a first area that does not overlap the first electrode in the first direction and a second area that overlaps the first electrode in the first direction, and the first area exhibits a first preferred orientation and the second area exhibits the first preferred orientation when the piezoelectric layer is analyzed by X-ray diffraction.

An actuator according to another aspect of the present disclosure includes a pressure chamber plate having a plurality of pressure chambers arranged in a first direction, a vibrating plate disposed at a position further than the pressure chamber plate in a second direction intersecting the first direction, at least one first electrode disposed at a position further than the vibrating plate in the second direction, a piezoelectric layer disposed at a position further than the first electrode in the second direction, and a second electrode disposed at a position further than the first electrode in the second direction. The piezoelectric layer has a first area that does not overlap the first electrode in the first direction and a second area that overlaps the first electrode in the first direction, and the first area exhibits a first preferred orientation and the second area exhibits the first preferred orientation when the piezoelectric layer is analyzed by X-ray diffraction.

DESCRIPTION OF EXEMPLARY EMBODIMENTS

1. First Embodiment

1-1. Overall Structure of Liquid Discharge Apparatus 100

Figure 1:
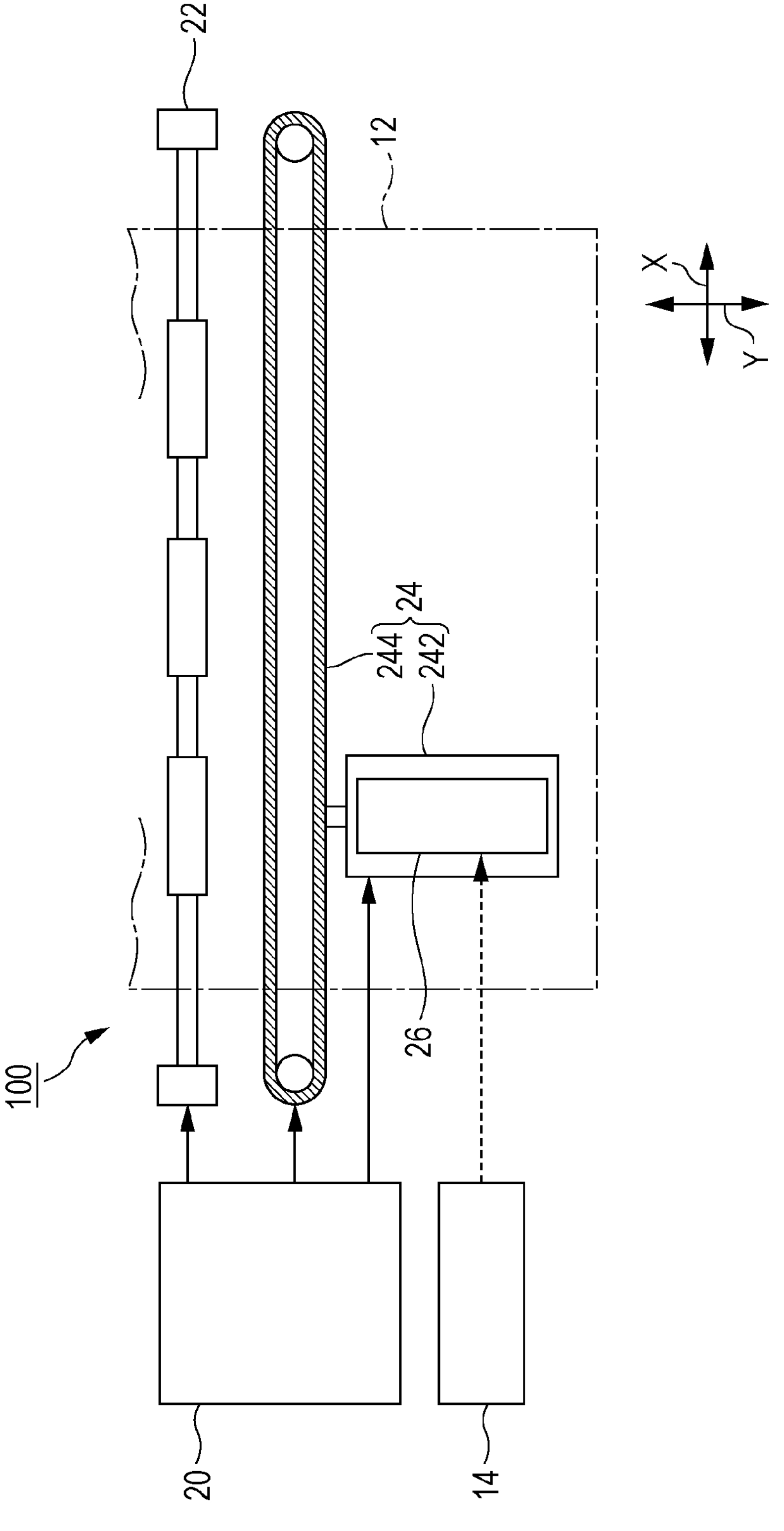
FIG. 1 is a schematic structural view of a liquid discharge apparatus according to a first embodiment.

FIG. 1 illustrates a structure of a liquid discharge apparatus 100 according to a first embodiment. In the description below, for the sake of convenience, the X-axis, Y-axis, and Z-axis that are orthogonal to each other will be used as appropriate.

The liquid discharge apparatus 100 according to the first embodiment is an ink jet printing apparatus that discharges an ink, which is an example liquid, onto a medium 12. The medium 12 is typically printing paper; alternatively, the medium 12 may be a print target of any material, such as plastic film or cloth. As illustrated in FIG. 1, the liquid discharge apparatus 100 includes a liquid container 14 for storing ink. The liquid container 14 may be a cartridge that is detachably attached to the liquid discharge apparatus 100, a pouch-shaped ink pack made of a flexible film, or an ink tank that can be refilled with an ink.

As illustrated in FIG. 1, the liquid discharge apparatus 100 includes a control unit 20, a transport mechanism 22, a moving mechanism 24, and a liquid discharge head 26. The control unit 20 includes, for example, at least one processing circuit such as a central processing unit (CPU) or a field-programmable gate array (FPGA) and at least one storage circuit such as a semiconductor memory. The control unit 20 performs overall control of components in the liquid discharge apparatus 100. The transport mechanism 22 transports the medium 12 parallel to the Y axis under the control of the control unit 20.

The moving mechanism 24 reciprocates the liquid discharge head 26 parallel to the X-axis under the control of the control unit 20. The moving mechanism 24 includes a substantially box-shaped transport member 242 that accommodates the liquid discharge head 26 and includes a transport belt 244 to which the transport member 242 is fixed. It should be noted that a plurality of liquid discharge heads 26 may be mounted on the transport member 242, or the liquid container 14 may be mounted on the transport member 242 together with the liquid discharge head 26.

The liquid discharge head 26 discharges an ink supplied from the liquid container 14 through a plurality of nozzles onto the medium 12 under the control of the control unit 20. The liquid discharge head 26 discharges the ink onto the medium 12 simultaneously with the transport of the medium 12 by the transport mechanism 22 and the reciprocation of the transport member 242, thereby forming an image on the medium 12.

1-2. Overall Structure of Liquid Discharge Head 26

Figure 2:
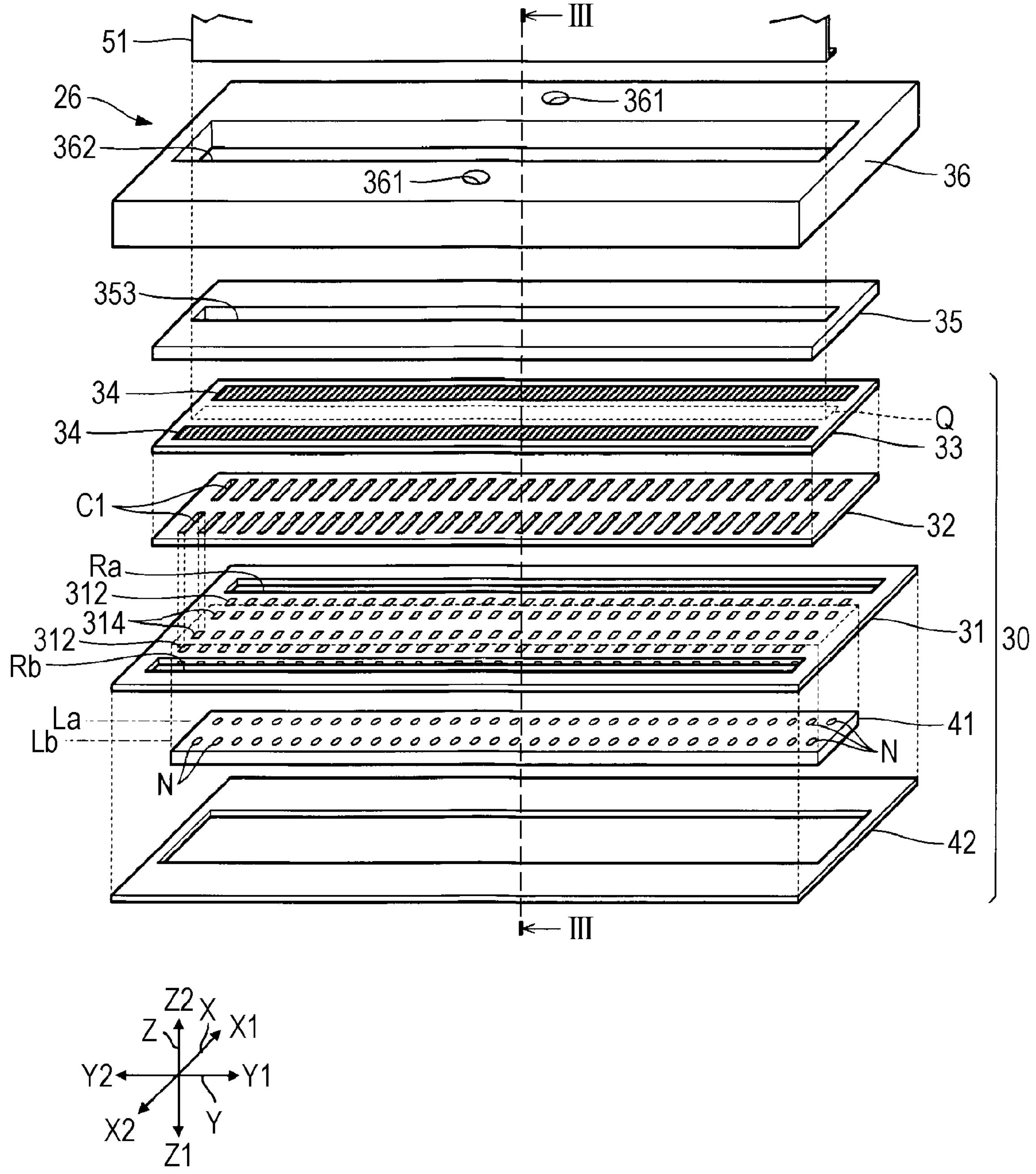
FIG. 2 is an exploded perspective view illustrating a liquid discharge head.
Figure 3:
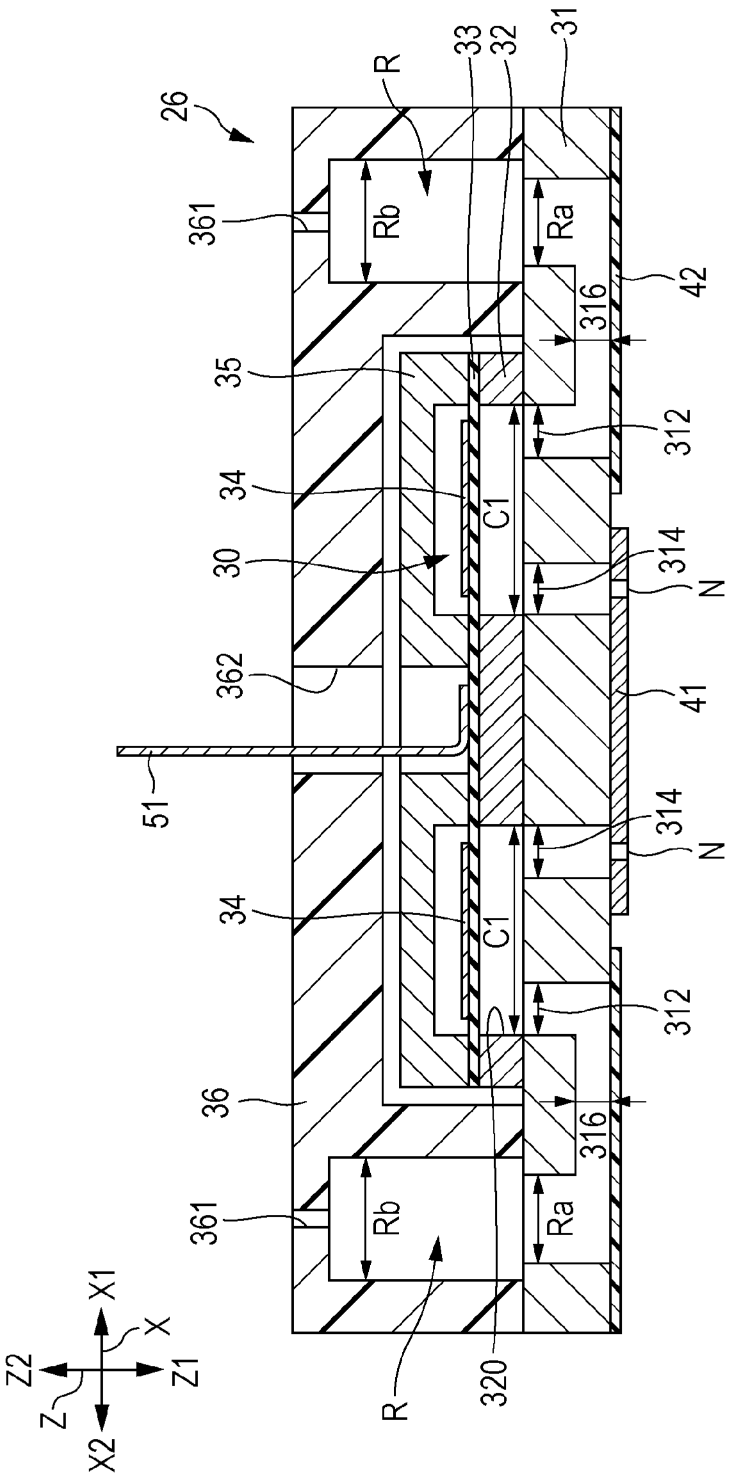
FIG. 3 is a cross view illustrating a liquid discharge head.

FIG. 2 is an exploded perspective view illustrating the liquid discharge head 26. FIG. 3 is a cross-sectional view taken along line III-III in FIG. 2. The cross section illustrated in FIG. 3 is parallel to the X-Z plane. The Z-axis is an axis extending in a direction in which the liquid discharge head 26 discharges an ink. As illustrated in FIG. 2, one direction along the X-axis is referred to as an X1 direction, and the direction opposite to the X1 direction is referred to as an X2 direction. Similarly, one direction along the Y-axis is referred to as a Y1 direction, and the direction opposite to the Y1 direction is referred to as a Y2 direction. One direction along the Z-axis is referred to as a Z1 direction, and the direction opposite to the Z1 direction is referred to as a Z2 direction. Hereinafter, a view in the Z1 direction or in the Z2 direction is referred to as "plan view". In addition, for example, the Y1 direction corresponds to a "first direction", and the Z2 direction corresponds to a "second direction" that intersects the first direction. It should be noted that the Y2 direction may be referred to as the "first direction".

As illustrated in FIG. 2, the liquid discharge head 26 has a plurality of nozzles N that are arranged parallel to the Y-axis. The nozzles N according to the first embodiment are divided into a first line La and a second line Lb that are arranged side by side at an interval parallel to the X-axis. Each of the first line La and the second line Lb is a group of the nozzles N aligned in the Y1 direction. The liquid discharge head 26 illustrated in FIG. 3 has components corresponding to each nozzle N in the first line La and components corresponding to each nozzle N in the second line Lb arranged substantially symmetrically in a plane. Accordingly, the following descriptions focus on the components corresponding to the first line La, and descriptions of the components corresponding to the second line Lb may be omitted as appropriate.

As illustrated in FIG. 2 and FIG. 3, the liquid discharge head 26 includes a nozzle plate 41, a vibration absorber 42, a flow channel plate 31, a pressure chamber plate 32, a vibrating plate 33, a plurality of piezoelectric elements 34, a sealing member 35, a housing 36, and a wiring board 51. Each of the nozzle plate 41, the vibration absorber 42, the flow channel plate 31, the pressure chamber plate 32, the vibrating plate 33, the sealing member 35, and the housing 36 is a member elongated in the Y1 direction. The nozzle plate 41, the flow channel plate 31, the pressure chamber plate 32, the vibrating plate 33, and the piezoelectric elements 34 are disposed in the Z2 direction in this order. In addition, the liquid discharge head 26 includes an actuator 30. The actuator 30 includes the pressure chamber plate 32, the vibrating plate 33, and the piezoelectric elements 34.

The nozzle plate 41 is a plate member having the nozzles N for discharging ink. Each nozzle N is typically a circular through hole but may be a through hole of a shape other than circular. The nozzle plate 41 may be fabricated by processing a single crystal substrate of silicon (Si) by using semiconductor manufacturing technologies, such as photolithography and photoetching. It should be noted that any known material and method may be used to fabricate the nozzle plate 41.

The flow channel plate 31 has a space Ra, a plurality of supply flow channels 312, a plurality of communication flow channels 314, and a relay liquid chamber 316. The space Ra is an elongated opening extending in the Y1 direction. Each of the supply flow channels 312 and the communication flow channels 314 is a through hole that is provided for each nozzle N. The relay liquid chamber 316 is an elongated space that extends through the nozzles N in the Y1 direction to communicate with the space Ra and the supply flow channels 312. Each of the communication flow channels 314 overlaps one nozzle N that corresponds to the communication flow channel 314 in plan view. The flow channel plate 31 may be fabricated by processing a single crystal substrate of silicon (Si) by using, for example, semiconductor manufacturing technology.

The pressure chamber plate 32 has pressure chambers C1 each storing an ink. Each of the pressure chambers C1 corresponds to a respective nozzle N of the nozzles N. The pressure chamber plate 32 has a wall surface 320 that defines the pressure chambers C1 corresponding to the respective nozzles N. Although not illustrated, a protective film is disposed on the wall surface 320 of the pressure chamber plate 32 to protect the pressure chamber plate 32 and the vibrating plate 33 from coming into contact with ink.

The vibrating plate 33 is disposed at a position further than the pressure chamber plate 32 in the Z2 direction, and the vibrating plate 33 is elastically deformable. The pressure chamber plate 32 and the vibrating plate 33 are separate members in the example illustrated in FIG. 2 and FIG. 3, but portions of the pressure chamber plate 32 and the vibrating plate 33 may be made of the same substrate.

The piezoelectric elements 34 are disposed at positions further than the pressure chamber plate 33 in the Z2 direction. The piezoelectric elements 34 are individually provided for respective pressure chambers C1 of the pressure chambers C1. The piezoelectric element 34 is an elongated passive element extending in the X1 direction in plan view. The piezoelectric element 34 is also a drive element that is driven upon application of a drive signal. The actuator 30, which includes the pressure chamber plate 32, the vibrating plate 33, and the piezoelectric elements 34, will be described in detail later.

The housing 36 is a case for storing an ink to be supplied to the pressure chambers C1 and is formed, for example, by injection molding of a resin material. The housing 36 has a space Rb and a supply port 361. The supply port 361 is a pipeline through which an ink is supplied from the liquid container 14 and communicates with the space Rb. The space Rb in the housing 36 and the space Ra in the flow channel plate 31 communicate with each other. The space consisting of the space Ra and the space Rb functions as a liquid reservoir R for storing an ink to be supplied to the pressure chambers C1. The ink that is supplied from the liquid container 14 passes through the supply port 361 and is stored in the liquid reservoir R. The flow of ink stored in the liquid reservoir R branches from the relay liquid chamber 316 into the supply flow channels 312 and is supplied to the pressure chambers C1 in parallel, thereby refilling the pressure chambers C1 with the ink. The vibration absorber 42 is a flexible film that functions as a wall surface of the liquid reservoir R and absorbs pressure fluctuations of the ink in the liquid reservoir R.

The sealing member 35 protects the piezoelectric elements 34 and reinforces the mechanical strength of the pressure chamber plate 32 and the vibrating plate 33. The sealing member 35 is fixed to the surface of the vibrating plate 33 with, for example, an adhesive. The sealing member 35 accommodates the piezoelectric elements 34 inside a concave portion of the sealing member 35 on a side that faces the vibrating plate 33. The wiring board 51 is coupled to a surface of the vibrating plate 33. The wiring board 51 is a mounting component that has a plurality of wires that electrically couple the control unit 20 and the liquid discharge head 26. The flexible wiring board 51 may be, for example, a flexible printed circuit (FPC) or a flexible flat cable (FFC). A drive signal and a reference voltage for driving the piezoelectric elements 34 are supplied from the wiring board 51 to the individual piezoelectric elements 34.

1-3. Actuator 30

Figure 4:
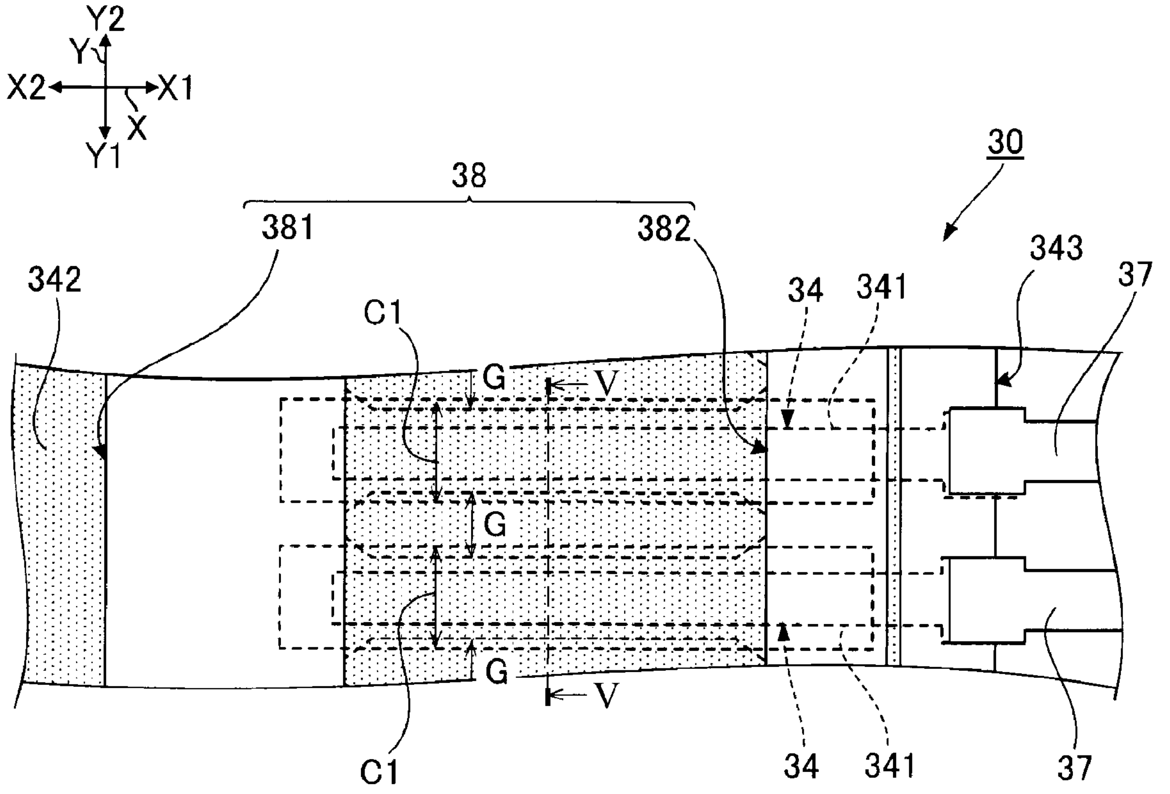
FIG. 4 is a plan view illustrating a part of an actuator.
Figure 5:
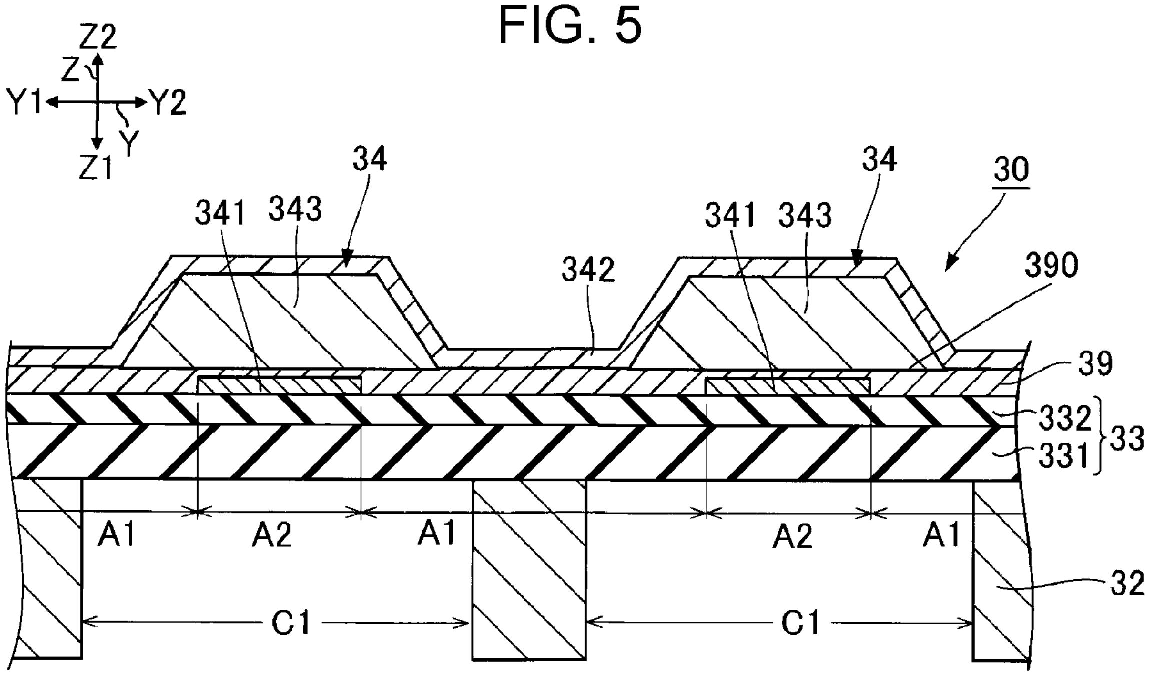
FIG. 5 is a cross-sectional view taken along line V-V in FIG. 4.

FIG. 4 is a plan view illustrating a portion of the actuator 30. FIG. 5 is a cross-sectional view taken along line V-V in FIG. 4. The actuator 30 illustrated in FIG. 4 and FIG. 5 includes the pressure chamber plate 32, the vibrating plate 33, the piezoelectric elements 34, a first line 37, a second line 38, and a seed layer 39. A second electrode 342 in FIG. 4 is dotted for convenience.

The pressure chambers C1 of the pressure chamber plate 32 illustrated in FIG. 4 are elongated spaces extending in the X1 direction in plan view. The pressure chambers C1 are arranged in the Y1 direction. The pressure chamber plate 32 may be fabricated by processing a single crystal substrate of silicon by using, for example, semiconductor manufacturing technology. It should be noted that the shape of the pressure chamber C1 in plan view is not limited to quadrangular as illustrated in FIG. 4 and may be, for example, a parallelogram.

The vibrating plate 33 and the pressure chamber plate 32 define the pressure chambers C1. Portions of the vibrating plate 33 corresponding to the pressure chambers C1 vibrate upon driving of the piezoelectric elements 34. The vibrating plate 33 includes a first layer 331 and a second layer 332 in the example illustrated in FIG. 5. The first layer 331 is in contact with the pressure chamber plate 32. The second layer 332 is disposed at a position further than the first layer 331 in the Z2 direction. The second layer 332 is disposed between the first layer 331 and a first electrode 341 and is in contact with the first layer 331 and the first electrode 341.

The material of the first layer 331 is, for example, silicon dioxide ($SiO_2$). The first layer 331 is fabricated by, for example, subjecting one side of a silicon single-crystal substrate to thermal oxidation. The material of the first layer 331 is not limited to silicon dioxide and may be another elastic material, such as silicon (Si).

The second layer 332 may be a nonconductive layer and may contain any one of zirconium (Zr), titanium (Ti), and silicon (Si). In other words, the end of the vibrating plate 33 in the Z2 direction may contain any one of Zr, Ti, and Si. The second layer 332 in the vibrating plate 33 according to the embodiment contains Zr. More specifically, the material of the second layer 332 is zirconium oxide ($ZrO_2$). The material of the second layer 332 may be another insulating material, such as silicon nitride (SiN). The second layer 332 is fabricated by, for example, sputtering and thermal oxidation. The second layer 332 is a non-oriented layer but is not particularly limited to a non-oriented layer.

The end of the vibrating plate 33 in the Z2 direction containing any one of Zr, Ti, and Si enables the vibrating plate 33 to have higher mechanical strength while ensuring the amount of deformation required for vibration of the piezoelectric elements 34 compared with an end containing none of Zr, Ti, and Si. Accordingly, the occurrence of cracking in the vibrating plate 33 can be further suppressed.

It should be noted that another layer such as a metal oxide layer may be disposed between the first layer 331 and the second layer 332. The first layer 331 and the second layer 332 may be the same or different layers. In addition, the vibrating plate 33 may be a single layer instead of the multiple layers. In the example in FIG. 5, the second layer 332 is thinner than the first layer 331, but the first layer 331 and the second layer 332 may have different thicknesses or the same thickness.

The piezoelectric element 34 typically includes the first electrode 341, a piezoelectric layer 343, and the second electrode 342 in this order from the vibrating plate 33 as illustrated in FIG. 5. The stacking direction of the first electrode 341, the piezoelectric layer 343, and the second electrode 342 corresponds to the Z2 direction.

The first electrode 341 is disposed at a position further than the vibrating plate 33 in the Z2 direction and is in contact with the vibrating plate 33. The first electrode 341 has an elongated shape extending in the X1 direction. The first electrodes 341 are arranged at an interval in the Y1 direction. Each first electrode 341 is an individual electrode provided for the corresponding piezoelectric element 34, and the first electrodes 341 are separated from each other.

The first electrode 341 contains a conductive material such as metal. The first electrode 341 may contain any one of aluminum (Al), platinum (Pt), and iridium (Ir). This structure containing any one of these elements enables the first electrode 341 to have elasticity sufficient to suppress the occurrence of cracking in the piezoelectric layer 343 while the structure enables the piezoelectric layer 343 to deform compared with a structure containing none of the elements. The first electrode 341 may include, for example, a laminate of a Pt layer and an Ir layer. The Pt layer of the first electrode 341 enables the piezoelectric layer 343 to deform. In addition, the Ir layer suppresses diffusion of the components of the piezoelectric layer 343. Accordingly, change in the composition of the piezoelectric layer 343 can be suppressed.

A first line 37 is electrically coupled to the first electrode 341 as illustrated in FIG. 4. The first line 37 is a lead to which a drive signal is supplied from a drive circuit (not illustrated) mounted on the wiring board 51 illustrated in FIG. 3. The first line 37 supplies the drive signal to the first electrode 341. The first line 37 is composed of a conductive material that has lower resistance than the first electrode 341. The first line 37 is a conductive pattern including, for example, a conductive film of gold (Au) on a conductive film of nichrome (NiCr).

The piezoelectric layer 343 is disposed at a position further than the first electrode 341 in the Z2 direction as illustrated in FIG. 5. The piezoelectric layer 343 is a band-shaped dielectric film extending continuously in the Y1 direction across a plurality of piezoelectric elements 34 as illustrated in FIG. 4. Grooves G parallel to the X-axis are provided in areas of the piezoelectric layer 343 that correspond to gaps between adjacent pressure chambers C1 respectively. The groove G is an opening that passes through the piezoelectric layer 343. The grooves G enable the piezoelectric elements 34 to deform individually for respective pressure chambers C1, resulting in a reduction in propagation of vibration between adjacent piezoelectric elements 34. It should be noted that each groove G may be a blind hole formed by removing a part of the piezoelectric layer 343 in the thickness direction.

The piezoelectric layer 343 has a first area A1 and a second area A2 in cross-sectional view in the X1 direction as illustrated in FIG. 5. The first area A1 is an area that does not overlap the first electrode 341 in plan view. The second area A2 is an area that overlaps the first electrode 341 in plan view. In other words, the position of the first area A1 in the Y1 direction differs from the position of the first electrode 341. The position of the second area A2 in the Y1 direction is the same as the position of the first electrode 341.

As illustrated in FIG. 5, the second electrode 342 is disposed at a position further than the piezoelectric layer 343 in the Z2 direction and is in contact with the piezoelectric layer 343. The second electrode 342 is a band-shaped common electrode extending continuously in the Y1 direction across a plurality of the piezoelectric elements 34 as illustrated in FIG. 4 and FIG. 5. A predetermined reference voltage is applied to the second electrode 342. The reference voltage is a constant voltage and is set to, for example, a voltage higher than a ground voltage. A voltage that corresponds to the difference between the reference voltage applied to the second electrode 342 and the drive signal supplied to the first electrode 341 is applied to the piezoelectric layer 343. It should be noted that the ground voltage may be applied to the second electrode 342. The second electrode 342 may be composed of a conductive material such as aluminum (Al), platinum (Pt), or iridium (Ir).

As described above, each of the first electrodes 341 is provided for the respective pressure chamber C1 of the pressure chambers C1, whereas the second electrode 342 is common to the pressure chambers C1. Accordingly, the second electrode 342 protects the piezoelectric layer 343. If the second electrode 342 is provided individually, a protective layer for protecting the piezoelectric layer 343 is additionally required; however, this structure omits such a protective layer.

In addition, the second electrode 342 covers the surface of the piezoelectric layer 343 in the Z2 direction. In other words, the second electrode 342 covers the piezoelectric layer 343. Accordingly, the piezoelectric layer 343 and other components are protected compared with a structure in which the piezoelectric layer 343 is not covered by the second electrode 342. This structure suppresses deterioration of the piezoelectric layer 343 due to, for example, hydrogen reduction.

It should be noted that a conductive oxide such as lanthanum nickel oxide (LNO) may be disposed on the first electrode 341 or on the second electrode 342. In addition, a layer such as a titanium layer may be disposed on the first electrode 341 or on the second electrode 342 as long as the conductivity of the electrode is not impaired.

A second line 38 that is electrically coupled to the second electrode 342 is disposed at a position further than the second electrode 342 in the Z2 direction as illustrated in FIG. 4. A reference voltage (not illustrated) is supplied to the second line 38 via the wiring board 51 illustrated in FIG. 3. As illustrated in FIG. 4, the second line 38 includes a band-shaped first conductive layer 381 extending in the Y1 direction and a band-shaped second conductive layer 382 extending in the Y1 direction. The first conductive layer 381 and the second conductive layer 382 are disposed in the X1 direction at a given spacing. The second line 38 functions also as a weight to suppress the vibration of the vibrating plate 33. The second line 38 is a conductive pattern including, for example, a conductive film of gold on a conductive film of nichrome.

The piezoelectric layer 343 of the piezoelectric element 34 deforms in response to application of a voltage across the first electrode 341 and the second electrode 342. The deformation of the piezoelectric element 34 causes the vibrating plate 33 to bend and deform. The vibration of the vibrating plate 33 changes the pressure in the pressure chambers C1 to cause the ink in the pressure chambers C1 to be discharged from the nozzles N illustrated in FIG. 3.

The seed layer 39 is disposed between the first electrode 341 and the piezoelectric layer 343 as illustrated in FIG. 5. The seed layer 39 is in contact with the first electrodes 341, the vibrating plate 33, and the piezoelectric layer 343. The seed layer 39 includes a crystal structure that is a seed crystal of the piezoelectric layer 343. The seed layer 39 is an orientation control layer that controls the orientation of a crystal of the piezoelectric layer 343. The seed layer 39 enhances the degree of orientation of the piezoelectric layer 343. Accordingly, the deformability of the piezoelectric element 34 can be increased, thereby enhancing the discharge performance of the liquid discharge head 26.

As described above, the actuator 30 of the liquid discharge head 26 includes the pressure chamber plate 32, the vibrating plate 33, the first electrodes 341, the piezoelectric layer 343, and the second electrode 342. The pressure chamber plate 32 has the pressure chambers C1 arranged in the Y1 direction. The piezoelectric layer 343 has the first area A1, which does not overlap the first electrode 341 in the Y1 direction, and the second area A2, which overlaps the first electrode 341 in the Y1 direction.

The first area A1 and the second area A2 each exhibit a preferred orientation, which is a first orientation, when the piezoelectric layer 343 is analyzed in the Z1 direction by X-ray diffraction (XRD). More specifically, the first area A1 and the second area A2 have the same crystal preferred orientation. Accordingly, the orientations of the first area A1 and the second area A2 do not differ excessively from each other. This structure enables reduced differences in physical properties, such as Young's modulus and thermal expansion coefficients, due to different crystal orientations between the first area A1 and the second area A2 of the piezoelectric layer 343. Accordingly, the occurrence of cracking due to the differences in physical properties between the first area A1 and the second area A2 can be suppressed, thereby suppressing degradation in discharge performance and degradation in durability.

The first orientation according to the embodiment is a (100) orientation. In other words, the first area A1 and the second area A2 have a (100) preferred orientation. Accordingly, the piezoelectric element 34 according to the embodiment has enhanced discharge performance compared with piezoelectric elements that have other crystal preferred orientations. It should be noted that the first orientation may be an orientation other than the (100) orientation, such as a (111) orientation.

The Lotgering factor that indicates the degree of orientation with respect to the first orientation when the piezoelectric layer 343 is analyzed in the Z1 direction by X-ray diffraction may range from 0.6 to 1.0 in the first area A1 and in the second area A2. When the Lotgering factors are within this range, differences in physical properties due to different crystal orientations in the first area A1 and the second area A2 can be reduced compared with a case in which the Lotgering factors are outside the range. Accordingly, the occurrence of cracking between the first area A1 and the second area A2 can be further suppressed.

The Lotgering factors may range from 0.8 to 1.0 in the first area A1 and the second area A2 respectively. The maximum value of the Lotgering factor is 1.0. When the Lotgering factors are within this range, piezoelectric properties of the piezoelectric layer 343 can be enhanced and differences in physical properties due to different crystal orientations between the first area A1 and the second area A2 can be reduced compared with a case in which the Lotgering factors are outside the range.

The material of the piezoelectric layer 343 may be a complex oxide that has a perovskite structure represented by the general composition formula $ABO_3$. Accordingly, the piezoelectric layer 343 exhibits excellent piezoelectric properties in response to an application of a voltage across the first electrode 341 and the second electrode 342 compared with the piezoelectric layer 343 that is composed of a material other than the complex oxide, thereby enhancing the discharge performance.

The complex oxide of the piezoelectric layer 343 may include at least lead (Pb), zirconium (Zr), and titanium (Ti). The piezoelectric layer 343 that contains the elements exhibits excellent piezoelectric properties in response to an application of a voltage across the first electrode 341 and the second electrode 342 compared with the piezoelectric layer 343 that contains none of the elements. More specifically, example materials of the piezoelectric layer 343 may include piezoelectric materials, such as lead zirconate titanate ($Pb(Zr, Ti)O_3$), and lead magnesium niobate-lead titanate ($Pb(Mg, Nb)O_3$—$PbTiO_3$) solid solution. The piezoelectric layer 343 may be composed of a lead free material such as sodium potassium niobate ($(KNa)NbO_3$) or bismuth sodium titanate ($(BiNa)TiO_3$).

The piezoelectric layer 343 has an average crystal particle size of 2.0 μm or less in the first area A1 and an average crystal particle size of 2.0 μm or less in the second area A2. In addition, the average crystal particle sizes may be 5.0 nm or more in the first area A1 and in the second area A2 respectively. The piezoelectric layer 343 having average crystal particle sizes of 2.0 μm or less in the first area A1 and in the second area A2 respectively suppresses the occurrence of cracking in the piezoelectric layer 343 compared with the piezoelectric layer 343 that has an average crystal particle size of more than 2.0 μm.

As described above, the liquid discharge head 26 includes the seed layer 39 to control the orientation of the piezoelectric layer 343. The seed layer 39 is disposed between the piezoelectric layer 343 and the vibrating plate 33 and corresponds to both the first area A1 and the second area A2. The seed layer 39 enables the first area A1 and the second area A2 to exhibit the first preferred orientation. In other words, the first area A1 and the second area A2 have the same crystal preferred orientation.

In addition, the seed layer 39 according to the embodiment is disposed to cover the surface of the first electrode 341 in the Z1 direction. In other words, the seed layer 39 overlaps the first electrode 341 in plan view, and the area of the seed layer 39 in plan view is larger than the area of the first electrode 341 in plan view. The seed layer 39 that is disposed to cover the surface of the first electrode 341 in the Z1 direction can reduce the surface unevenness of the first electrode 341 compared with a structure in which the seed layer 39 is not disposed to cover the first electrode 341. With this structure, the occurrence of cracking in the piezoelectric layer 343 due to the unevenness can be suppressed.

The portion of the seed layer 39 corresponding to the first area A1 is thicker than the portion of the seed layer 39 corresponding to the second area A2, thereby enabling a surface 390 of the seed layer 39 in the Z2 direction to have a flat surface or a substantially flat surface. Accordingly, the occurrence of cracking in the piezoelectric layer 343 due to the steps of the first electrodes 341 can be suppressed.

The seed layer 39 may contain any material as long as the seed layer 39 is capable of functioning as the orientation control layer and may contain titanium (Ti) or a complex oxide that has a perovskite structure. More specifically, the seed layer 39 may contain a complex oxide that has a perovskite structure, and may contain any one of bismuth (Bi), lead (Pb), iron (Fe), and titanium (Ti). Such a seed layer 39 containing any one of these elements enhances the degree of orientation of the piezoelectric layer 343 compared with the seed layer 39 containing none of the elements. In particular, the piezoelectric layer 343 that contains at least Pb, Zr, and Ti, and the seed layer 39 that contains any one of Bi, Pb, Fe, and Ti enable the first area A1 and the second area A2 to have the same crystal preferred orientation more readily. In addition, the piezoelectric layer 343 that contains at least Pb, Zr, and Ti has constituent elements similar to those of the seed layer 39, suppressing diffusion of impurities between the piezoelectric layer 343 and the seed layer 39 during the manufacturing process.

Figure 6:
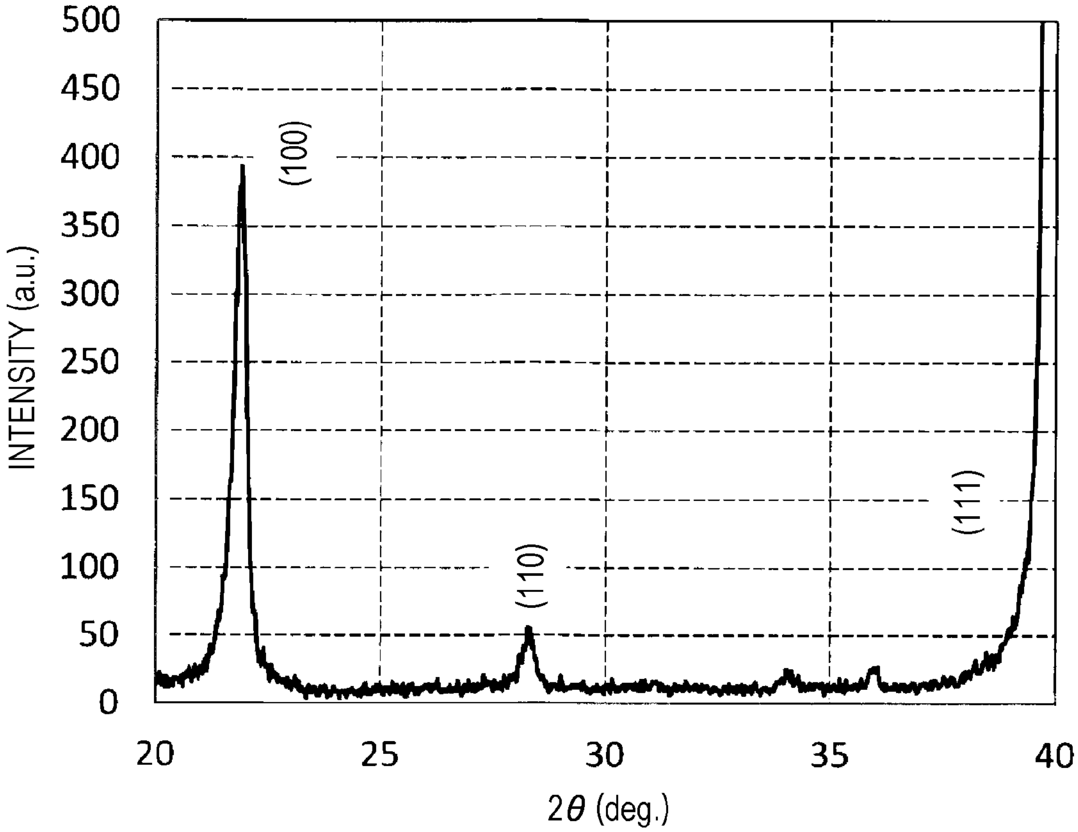
FIG. 6 illustrates a result of X-ray diffraction (XRD) in a second area.
Figure 7:
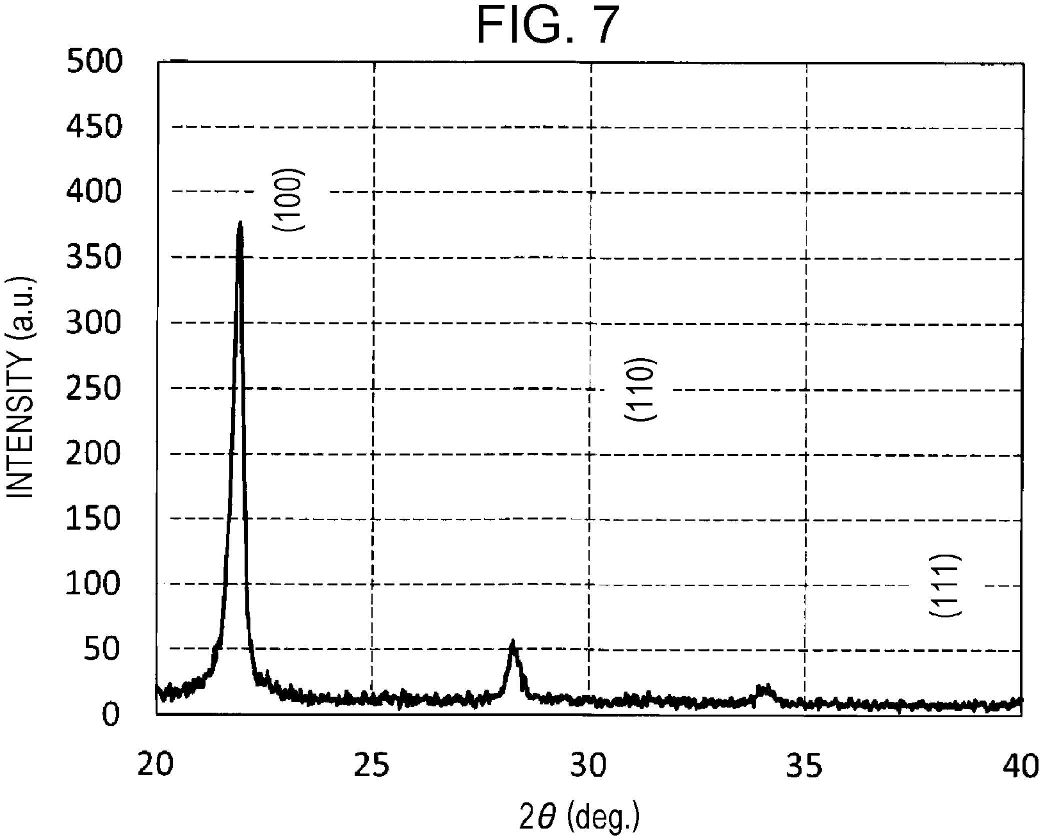
FIG. 7 illustrates a result of XRD in a first area.

FIG. 6 illustrates a result of XRD in the second area A2 in the piezoelectric layer 343 according to the embodiment. FIG. 7 illustrates a result of XRD in the first area A1 in the piezoelectric layer 343 according to the embodiment. Here, the result obtained by using the seed layer 39 that contains a complex oxide having a perovskite structure containing Bi, Pb, Fe, and Ti is shown.

More specifically, the actuator 30 that includes the seed layer 39 containing Bi, Pb, Fe, and Ti was fabricated as described below and the piezoelectric layer 343 was analyzed by XRD.

First, a silicon dioxide film as the first layer 331 was formed on a silicon substrate as the pressure chamber plate 32. Then, a zirconium film was formed by sputtering to subject the zirconium film to thermal oxidation to form a zirconium oxide film as the second layer 332. After the process, a laminate including a titanium layer, a platinum layer, and an iridium layer was formed on the second layer 332 by sputtering. Then, the laminate was processed by photo lithography and dry etching to form a plurality of first electrodes 341.

After the process, a solution of Bi:Ti:Fe:Ti=110:10:50:50 was applied to cover the first electrodes 341 by spin coating. The coated first electrodes 341 were dried at 350° C. and heat-treated at 740° C. for five minutes to form the seed layer 39. After the process, a solution of Pb:Zr:Ti=1.18:53:48 was applied to the seed layer 39 by spin coating. The coated seed layer 39 was dried at 200° C. and then at 410° C. and heat-treated at 740° C. for five minutes to form the piezoelectric layer 343. After the process, the second electrode 342 including a iridium layer and a titanium layer was formed on the piezoelectric layer 343 by sputtering. The actuator 30 was thus fabricated.

The piezoelectric layer 343 of the fabricated actuator 30 was analyzed by XRD. The XRD analysis was performed by using D8DISCOVER with GADDS manufactured by Bruker Corporation.

As illustrated in FIG. 6 and FIG. 7, both the first area A1 and the second area A2 according to the embodiment exhibited a (100) preferred orientation respectively. Accordingly, cracking between the first area A1 and the second area A2 can be suppressed, and degradation in discharge performance and durability can be suppressed.

2. Second Embodiment

A second embodiment is described. In the following examples, the reference numerals used in the first embodiment will are applied to components that function similarly to those in the first embodiment, and detailed descriptions of the components will be omitted as appropriate.

Figure 8:
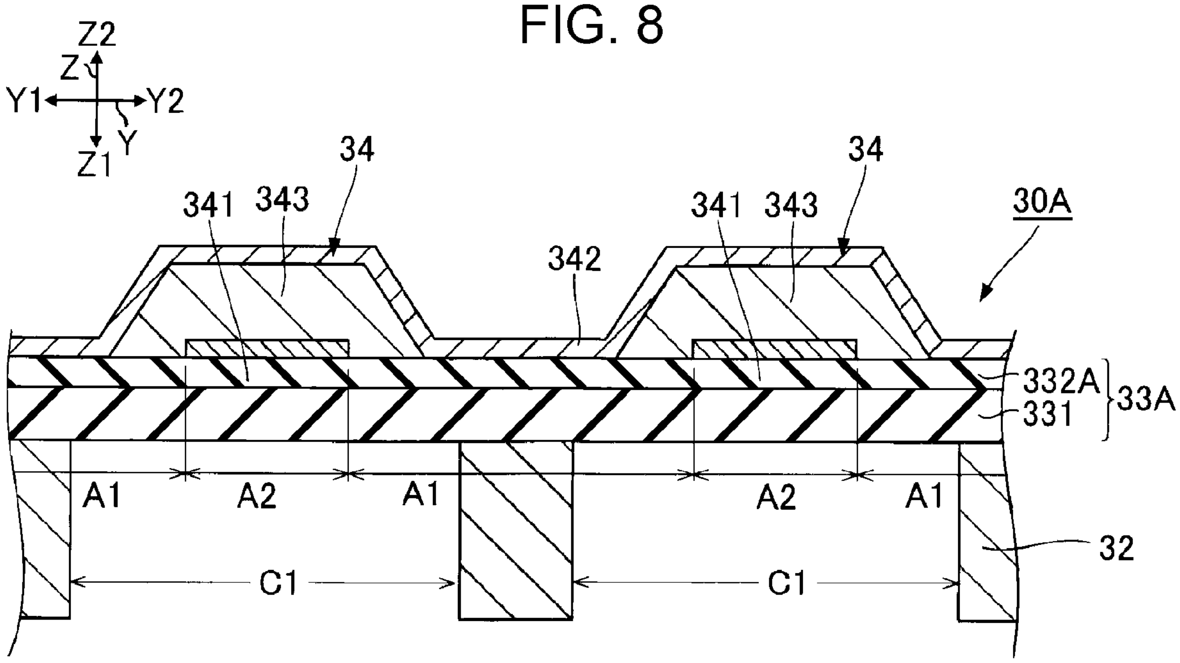
FIG. 8 is a cross-sectional view illustrating a part of an actuator according to a second embodiment.

FIG. 8 is a cross-sectional view illustrating an actuator 30A according to the second embodiment and corresponds to FIG. 5 according to the first embodiment. In the second embodiment, the actuator 30A is used instead of the actuator 30 according to the first embodiment. In the description of the actuator 30A below, features that differ from those of the actuator 30 according to the first embodiment are described and descriptions of similar features are omitted.

The seed layer 39 according to the first embodiment is not included in the actuator 30A in FIG. 8. A vibrating plate 33A in the actuator 30A includes the first layer 331 and a second layer 332A. The second layer 332A functions as an orientation control layer that controls the crystal orientation of the piezoelectric layer 343. For example, the second layer 332A exhibits the first preferred orientation that is the same as the piezoelectric layer 343.

Similarly to the first embodiment, in the actuator 30A, the first area A1 and the second area A2 each exhibit the first preferred orientation when the piezoelectric layer 343 is analyzed in the Z1 direction using XRD. This structure enables reduced differences in physical properties, such as Young's modulus and thermal expansion coefficients, due to different crystal orientations between the first area A1 and the second area A2 of the piezoelectric layer 343. Accordingly, the occurrence of cracking due to differences in physical properties between the first area A1 and the second area A2 can be suppressed, thereby suppressing degradation in discharge performance and durability.

2. Modifications

The above-described embodiments may be modified in various ways. Specific modifications applicable to the above-described embodiments will be described below. Two or more modifications selected from the following modifications may be combined as long as they are consistent with each other as appropriate. The following modifications relating to the first embodiment may be applicable to the second embodiment as long as they are consistent with each other.

In the first embodiment, the first electrodes 341 of the piezoelectric elements 34 function as the individual electrodes and the second electrode 342 functions as the common electrode; however, the first electrode 341 may be a common electrode and the second electrode 342 may be an individual electrode. In such a case, the piezoelectric layer 343 and the first electrode 341, which is the common electrode, have also portions that do not overlap each other. In such a case, the first embodiment is applicable. Alternatively, both the first electrodes 341 and the second electrode 342 may be individual electrodes.

Figure 9:
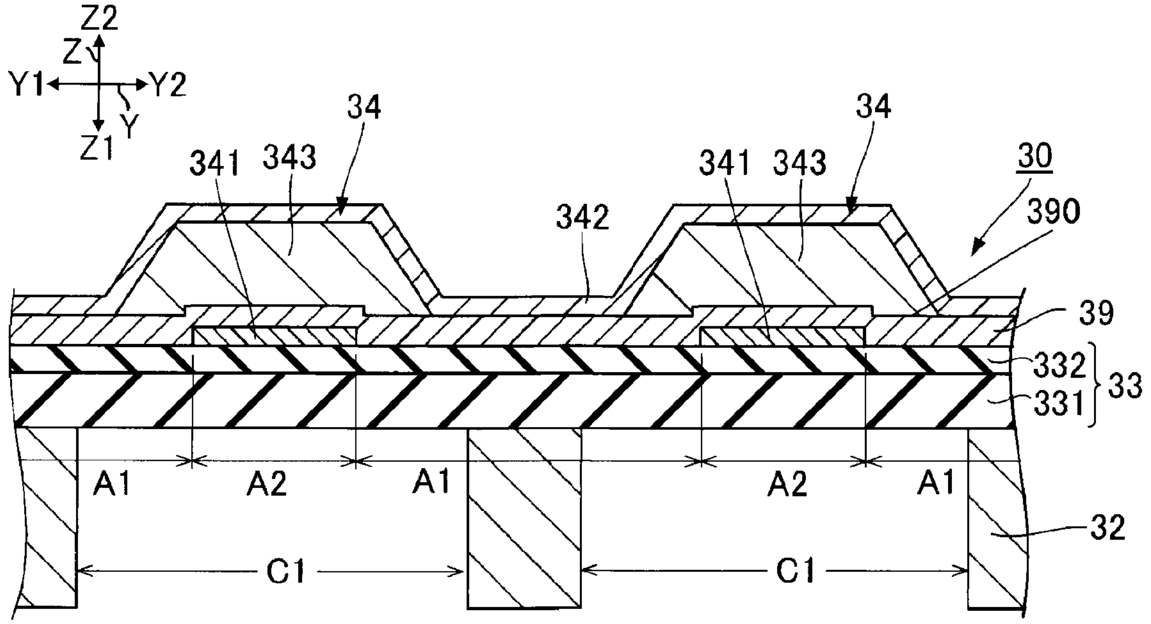
FIG. 9 is a cross-sectional view illustrating a part of an actuator according to a modification.

FIG. 9 is a cross-sectional view illustrating a portion of the actuator 30 according to a modification. In the first embodiment, the surface 390 of the seed layer 39 in the Z2 direction is flat; however, the surface 390 of the seed layer 39 in the Z2 direction may be uneven to correspond to the steps of the first electrodes 341 as illustrated in FIG. 9.

Figure 10:
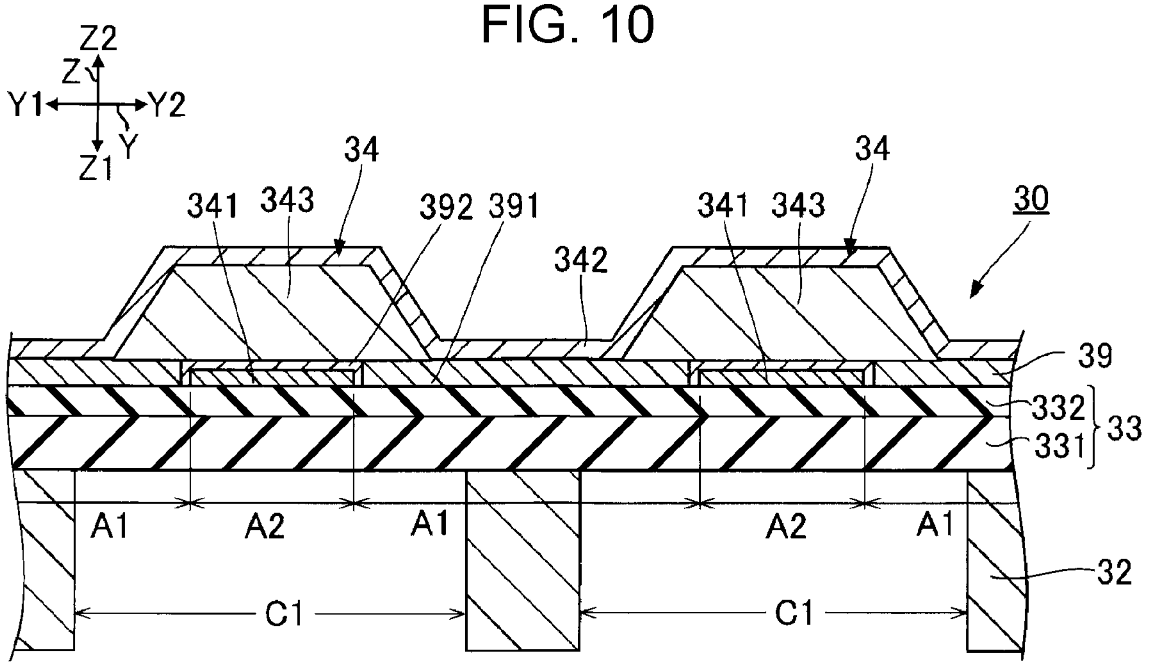
FIG. 10 is a cross-sectional view illustrating a part of an actuator according to a modification.

FIG. 10 is a cross-sectional view illustrating a portion of the actuator 30 according to a modification. In the first embodiment, the seed layer 39 is common in the first area A1 and the second area A2. However, the seed layer 39 may include a first portion 391 that corresponds to the first area A1 and a second portion 392 that corresponds to the second area A2 as illustrated in FIG. 10. The first portion 391 and the second portion 392 are made of materials different from each other. It should be noted that the first area A1 and the second area A2 have the same first preferred orientation.

Although the serial-type liquid discharge apparatus 100 that reciprocates the transport member 242 having the liquid discharge head 26 mounted thereon has been described in the first embodiment, the embodiments of the present disclosure may be applicable to a line-type liquid discharge apparatus that includes a plurality of nozzles N that cover the entire width of the medium 12.

The liquid discharge apparatus 100 according to the first embodiment may be employed in devices dedicated for printing and in a variety of devices such as facsimile apparatuses and copying machines. It should be noted that the application of the liquid discharge apparatus according to the embodiments of the present disclosure is not limited to printing. For example, the liquid discharge apparatus that discharges a solution of coloring material may be used as a manufacturing apparatus for producing color filters for display apparatuses such as liquid crystal display panels. In addition, the liquid discharge apparatus that discharges a solution of conductive material may be used as a manufacturing apparatus for producing wires and electrodes of wiring boards. The liquid discharge apparatus that discharges a solution of bioorganic material may be used, for example, as a manufacturing apparatus for manufacturing biochips.

The actuators according to the embodiments of the present disclosure are not limited to the actuators mounted to the liquid discharge head and may be applicable to actuators mounted to other devices. Such devices include, for example, ultrasonic devices such as ultrasonic transmitters, ultrasonic motors, pressure sensors, and pyroelectric sensors.

What is claimed is:

1. A liquid discharge head comprising:

a pressure chamber plate having a plurality of pressure chambers arranged in a first direction;

a vibrating plate disposed at a position further than the pressure chamber plate in a second direction intersecting the first direction;

at least one first electrode disposed at a position further than the vibrating plate in the second direction;

a piezoelectric layer disposed at a position further than the first electrode in the second direction;

a seed layer disposed between the piezoelectric layer and the vibrating plate, and contacting the at least one first electrode and the vibrating plate, and corresponds to the first area and the second area to control the orientation of the piezoelectric layer; and a second electrode disposed at a position further than the first electrode in the second direction, wherein the piezoelectric layer has a first area that does not overlap the first electrode in the second direction and a second area that overlaps the first electrode in the first direction, and the first area exhibits a first preferred orientation when the second area is analyzed by X-ray diffraction, and the second area exhibits the first preferred orientation when the second area is analyzed by X-ray diffraction.

2. The liquid discharge head according to claim 1, wherein the first orientation is a (100) orientation.

3. The liquid discharge head according to claim 1, wherein a Lotgering factor that indicates a degree of orientation with respect to the first orientation when the piezoelectric layer is analyzed by X-ray diffraction ranges from 0.6 to 1.0 in the first area and in the second area.

4. The liquid discharge head according to claim 3, wherein the Lotgering factor ranges from 0.8 to 1.0 in the first area and in the second area.

5. The liquid discharge head according to claim 1, wherein the piezoelectric layer is a complex oxide having a perovskite structure.

6. The liquid discharge head according to claim 1, wherein the piezoelectric layer contains at least Pb, Zr, and Ti.

7. The liquid discharge head according to claim 1, wherein the first electrode contains Pt or Ir.

8. The liquid discharge head according to claim 1, wherein an end of the vibrating plate in the first direction contains any one of Zr, Ti, and Si.

9. The liquid discharge head according to claim 1, wherein the piezoelectric layer has an average crystal particle size of 2.0 μm or less in the first area and an average crystal particle size of 2.0 μm or less in the second area.

10. The liquid discharge head according to claim 1, wherein the first electrode is disposed individually for respective pressure chambers, and the second electrode is common to the pressure chambers.

11. The liquid discharge head according to claim 1, wherein the second electrode is disposed to cover a surface of the piezoelectric layer in the second direction.

12. The liquid discharge head according to claim 1, wherein the seed layer is disposed to cover a surface of the first electrode in the second direction.

13. The liquid discharge head according to claim 1, wherein a portion of the seed layer corresponding to the first area is thicker than a portion of the seed layer corresponding to the second area.

14. The liquid discharge head according to claim 1, wherein the seed layer contains Bi, Pb, Fe, and Ti.

15. An actuator comprising:

a pressure chamber plate having a plurality of pressure chambers arranged in a first direction;

a vibrating plate disposed at a position further than the pressure chamber platen a second direction intersecting the first direction;

at least one first electrode disposed at a position further than the vibrating plate in the second direction;

a piezoelectric layer disposed at a position further than the first electrode in the second direction;

a seed layer disposed between the piezoelectric layer and the vibrating plate, and contacting the at least one first electrode and the vibrating plate, and corresponds to the first area and the second area to control the orientation of the piezoelectric layer; and a second electrode disposed at a position further than the first electrode in the second direction, wherein the piezoelectric layer has a first area that does not overlap the first electrode in the second direction and a second area that overlaps the first electrode in the second direction, and the first area exhibits a first preferred orientation when the first area is analyzed by X-ray diffraction, and the second area exhibits the first preferred orientation when the second area is analyzed by X-ray diffraction.

* * * * *